Feb. 21, 1956 H. L. BOPPEL 2,735,186
GAUGING DEVICE
Filed Dec. 8, 1951

INVENTOR.
Henry L. Boppel
BY Edward J. Norj Jr
atty

United States Patent Office 2,735,186
Patented Feb. 21, 1956

2,735,186
GAUGING DEVICE

Henry L. Boppel, Dayton, Ohio, assignor to The Sheffield Corporation, Dayton, Ohio, a corporation of Ohio Application December 8, 1951, Serial No. 260,640

4 Claims. (Cl. 33—147)

This invention relates to gauging devices and more particularly to gauging devices in which a size indication is produced by air or other fluid under pressure.

One object of the invention is the provision of an air gauge for size measurement embodying a generally C-shaped frame having a pair of parallel holes in one leg of the frame and an anvil in the other leg, the gauge including members extending through the holes, one of these members being work operated and the other being a supporting member carrying an orifice block having an orifice cooperating with the work operated member.

Another object of the invention is the provision of an air gauging device of simple construction adapted for use with a C-shaped frame of a snap gauge to transform said gauge into an air gauge for measurement of size by measuring the rate of flow of air through a leakage orifice.

Another object is the provision of an air gauging unit or assemblage adapted for mounting in the parallel holes of a C-shaped frame of a snap gauge, such unit comprising a support adapted to be adjustably mounted in one of the holes in the frame and supporting a work operated element by means of spaced spring blades, such element being adapted for movement longitudinally of the other hole in the frame and controlling the leakage flow of air from an orifice block carried by the supporting element.

Other objects and advantages of the invention will be apparent from the following description, the appended claims, and the accompanying drawing, in which, Fig. 1 is a side elevation, partly in vertical section, through an adjustable gauge embodying the present invention;

Figure 4:
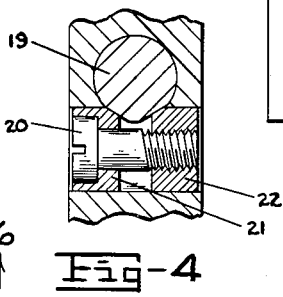
Fig. 4 is a transverse section on the line 4—4 of Fig. 1.
Figure 5:
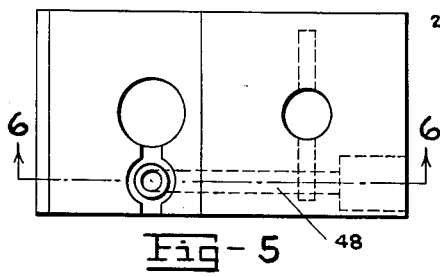
Fig. 5 is an enlarged face view of the orifice block as viewed from above.

Referring more particularly to the drawing in which the same reference numerals are applied to like parts in the different views, 10 generally designates the C-shaped frame of a go, no-go snap gauge. Such a frame according to American gauging design standards includes a body portion 11, an anvil 12 carried by one leg of the frame and the other leg of the frame having a pair of parallel holes 13 and 14 extending toward the anvil. Transverse holes 15, 15 are provided for holding wedge clamps 21, 22 as illustrated in Fig. 4. As ordinarily used in these snap gauges, the two holes 13 and 14 carry the go, no-go plugs or studs held securely by the wedge clamps mentioned.

In accordance with the present invention the go, no-go plugs or studs are not employed. One is replaced by a work operated bar 18 having limited free longitudinal movement in the hole 13. A supporting member or rod 19 is adjustably fixed in the hole 14 by tightening screw 20 so as to draw the two wedge clamps 21 and 22 together, see Fig. 4, so as to hold the member 19 at any desired position of adjustment against turning and longitudinal movement in the frame.

The upper end of the member 19 has a reduced neck portion rotatably carrying a nut 23 threaded in the threaded passage 24 in the frame. The head of the nut engages against a washer 25 on the lower side of a flexible spring blade 26. The member 19 extends up through a hole in the spring blade and through a hole in an orifice block 27 and its upper end is threaded so that the nut 28 can clamp the orifice block 27, washer 25 and the spring blade 26 securely against the head of the upper end of the nut 23.

At the lower end of the member 19 is another spring blade 30 parallel to the blade 26. The blade 30 is held by a screw 31 threaded in the lower end of the member 19 and passing through a hole in the spring blade as will be apparent.

The two spring blades extend parallel to one another and carry the movable member or bar 18 for limited movement in a direction towards and from the anvil 12. The spring blade 30 is clamped against the lower end of the bar 18 by the work engaging stud 32 threaded in a threaded socket in the bar 18. The upper end of the bar is clamped against the lower side of the blade 26 by means of a clamp screw 33 extending through a flow controlling member 34 and a bushing 35. The lower end of the screw 33 is threaded in the upper end of the bar 18 and clamps the elements 34 and 35 to one another and against the upper end of the bar, with the spring 26 interposed between. Thus, the bar 18 can move freely, being guided by the threaded bushing 37, screwed in the threaded passage 38 in the frame. Upward movement of the bar 18, in accordance with the size of the article 39 applied to the anvil 12, is limited by the distance between the upper side of the spring blade 26 and the lower side of the orifice block 27. The spring blades 26 and 30 normally hold the bar 18 in its lowered position in which the lower side of the member 34 contacts the upper surface 40 of the orifice block 27.

Figure 1:
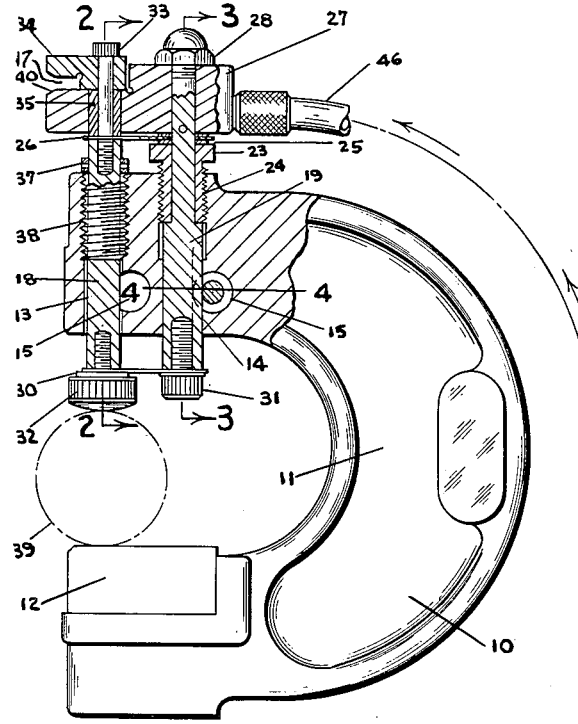
Figures 2, 3:
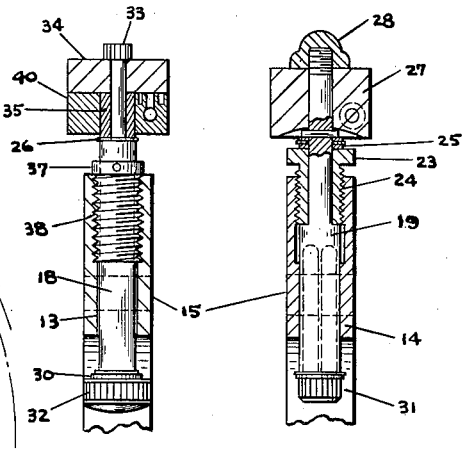
Fig. 2 is a longitudinal section on the line 2—2 of Fig. 1.
Fig. 3 is a longitudinal section on the line 3—3 of Fig. 1.
Figure 8:
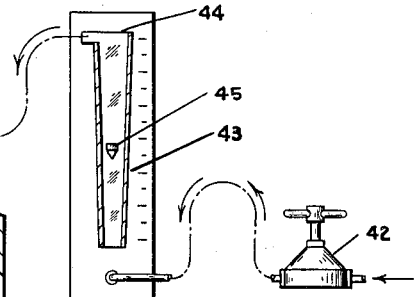
Fig. 8 is a schematic view of the air supply and flow gauging device to which the gauging unit of the present invention may be connected.
Figure 6:
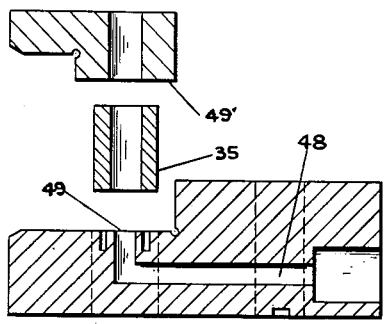
Fig. 6 is a section on the line 6—6 of Fig. 7.
Figure 7:
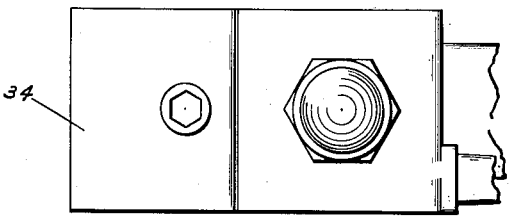
Fig. 7 is a top plan view of the upper portion of the gauging device.

When a part is applied to the anvil 12 the work operated member 32 will be moved upwardly to an extent determined by the size of the work, and space the member 34 from the surface 40. The relative separation of these parts is determined by an air gauging device. As shown in Figs. 7 and 8, air may be supplied from a pressure regulator 42 to a flow gauging device generally designated 43 and of any suitable character such that the amount of fluid flow taking place can be indicated. In the particular form of construction shown for exemplification, air supplied under pressure flows upwardly through a tapered tube and the location of the float 45 indicates the amount of air leakage taking place. The upper end of the tube is connected to a pipe or conduit 46 which extends to the pasasge 48 of the orifice block 27. This passage as shown in Fig. 6 extends to an orifive 49 facing upwardly and cooperating with a flat flow controlling lower surface 49' of the member 34. The position to which the member 34 is moved by the work will thus determine the amount of flow from the orifice 49 and this is indicated on the flow gauging device. By setting the supporting member 19 in its proper position in the frame so that a specified indication is obtained on the indicating device when a master of known size is employed, it will be understood that the exact size of the workpiece gauged can be read on the calibrated scale of the indicator. It will also be apparent that a wide range of adjustment is provided so the device is adapted to be set up to check diameters of different size ranges as may be required.

To facilitate the initial setup for any particular size, a part of known size is placed between the anvil 12 and the work operated member 32, thus raising the latter. The supporting member or rod 19 is then adjusted axially by turning the nut 23 so as to relatively adjust the orifice block 27 and the element 34 until the gauge reading corresponds to the size of the object in place in the gauge. It is preferred that an adjustable air flow gauge be employed in which case the maximum and minimum dimensions of a required tolerance range are made to correspond to the relative settings of the orifice block 27 and the flow controlling member 34 when maximum and minimum masters of known size are interposed in the space 17. These masters that are applied temporarily in the space 17 differ in size by the permissible tolerance. After setting the gauge maximum and minimum positions by using the maximum and minimum masters in the space 17, the member 19 may be adjusted so that the indication produced on the gauge corresponds to the actual size of the part applied to the anvil 12.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An adjustable air gauge comprising a generally C-shaped frame having an anvil on one leg of the frame and a pair of parallel holes in the other leg and extending towards the anvil, a supporting member extending through one of the holes, means for holding said member in fixed position on the frame, an orifice block carried by said supporting member and having a fluid supply passage adapted for connection to a fluid flow gauging device and also having an orifice opening through its upper surface through which fluid supplied thereto is discharged, a work engaging bar arranged for limited movement longitudinally of the other of said parallel holes and slidably guided in said orifice block for straight line movement, parallel spring blades supporting said bar on said member, and a flow controlling member carried by said bar adjacent the upper surface of said orifice block and in cooperative association with the said orifice.

2. An adjustable size air gauge for checking diameters, comprising a generally C-shaped frame having an anvil on one leg of the frame and a pair of parallel holes in the other leg and extending towards the anvil, a supporting member extending through one of the holes, means for adjusting the supporting member longitudinally in said hole, an orifice block carried by one end of said supporting member and having a fluid supply passage adapted for connection to a fluid flow gauging device and also having an orifice through which fluid supplied thereto is discharged, a work engaging bar, means cooperating between said supporting member and said bar carrying the bar for limited endwise movement longitudinally of the other of said holes, and a flow controlling member carried by said bar in cooperative association with the said orifice, said orifice block and flow controlling member having spaced setting surfaces whereby different orifice openings can be obtained for setup purposes by engaging said surfaces with spacer elements.

3. An air gauging unit adapted for mounting in the parallel holes of a C-shaped frame of a go, no-go snap gauge, comprising a supporting member adapted to be adjustably fixed in one of the holes, an orifice block fixed to one end of said member, and having a fluid supply passage adapted for connection to a fluid flow gauging device and also having an orifice through which fluid supplied thereto under pressure is discharged, a work engaging bar, spaced parallel spring blades fixed at opposite ends thereof to the supporting member and the bar and carrying the bar for movement in the other hole of the frame, and a flow controlling member carried by said bar in cooperative association with said orifice, said orifice block and flow controlling member having spaced opposed setting surfaces whereby different orifice openings can be obtained for setup purposes by closing said surfaces against interposed spacer elements.

4. An air gauging unit adapted for mounting in a pair of parallel holes of a C-shaped frame of a go, no-go snap gauge, comprising a supporting member adapted to be adjustably fixed in one of the holes, an orifice block fixed to one end of said member having a hole therethrough for situation in coaxial relationship with the other of said holes in said frame and having a fluid supply passage adapted for connection to a fluid flow gauging device and also having an orifice opening through its upper surface laterally of the hole therethrough and through which fluid supplied thereto under pressure is discharged, a work engaging bar, spaced parallel spring blades fixed at opposite ends thereof to the supporting member and the bar and carrying the bar for movement in the coaxial holes of the frame and orifice block, and a flow controlling member carried by said bar adjacent the upper surface of said orifice block and in cooperative association wtih said orifice, said orifice block and flow controlling member having spaced opposed surfaces across their forward edges adapted for the interposition therebetween of maximum and minimum spacer elements of known size difference to obtain predetermined orifice openings in setup operations.

References Cited in the file of this patent

UNITED STATES PATENTS

| | | |
|---|---|---|
| 1,425,283 | Pratt | Aug. 8, 1922 |
| 2,465,035 | Polk et al. | Mar. 22, 1949 |
| 2,477,399 | Aller | July 26, 1949 |
| 2,501,130 | Kuppersmith | Mar. 21, 1950 |
| 2,571,917 | Mennesson | Oct. 16, 1951 |
| 2,580,009 | Emery | Dec. 25, 1951 |